US008846792B2

(12) United States Patent
Keung et al.

(10) Patent No.: US 8,846,792 B2
(45) Date of Patent: Sep. 30, 2014

(54) CONSTRUCTION COMPRISING TIE LAYER

(75) Inventors: Jay Kin M. Keung, Humble, TX (US); Michael B. Rodgers, Seabrook, TX (US); Porter C. Shannon, Seabrook, TX (US); Andy H. Tsou, Allentown, PA (US); Yuichi Hara, Hiratsuka (JP); Hirokazu Shibata, Hiratsuka (JP); Yoshihiro Soeda, Hiratsuka (JP)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 210 days.

(21) Appl. No.: 13/605,521

(22) Filed: Sep. 6, 2012

(65) Prior Publication Data

US 2013/0087263 A1 Apr. 11, 2013

Related U.S. Application Data

(63) Continuation-in-part of application No. 12/091,608, filed as application No. PCT/US2006/060272 on Oct. 26, 2006, now Pat. No. 8,580,877.

(51) Int. Cl.
| | |
|---|---|
| *C09J 7/02* | (2006.01) |
| *B32B 25/00* | (2006.01) |
| *B60C 1/00* | (2006.01) |
| *B32B 27/08* | (2006.01) |
| *B32B 27/28* | (2006.01) |
| *C09J 123/28* | (2006.01) |
| *C08L 21/00* | (2006.01) |
| *C08L 23/28* | (2006.01) |
| *C08L 9/00* | (2006.01) |
| *C08L 23/20* | (2006.01) |
| *B29D 30/06* | (2006.01) |
| *C08L 23/26* | (2006.01) |
| *C08L 7/00* | (2006.01) |

(52) U.S. Cl.
CPC .............. B60C 1/0008 (2013.01); B32B 25/00 (2013.01); *B60C 2005/145* (2013.01); *B32B 2605/00* (2013.01); *C08L 21/00* (2013.01); B32B 27/08 (2013.01); *C08L 23/283* (2013.01); B32B 27/28 (2013.01); *C08L 9/00* (2013.01); *C08L 23/20* (2013.01); *B29D 2030/0682* (2013.01); B29D 30/0681 (2013.01); C09J 123/283 (2013.01); *C08L 23/26* (2013.01); *C08L 7/00* (2013.01)
USPC ........... 524/271; 524/270; 524/273; 524/274; 524/380; 524/384; 524/385; 152/450; 152/510

(58) Field of Classification Search
CPC .... B29D 30/0681; B32B 25/00; B32B 27/08; B32B 27/28; B60C 1/0008; C09J 123/283
USPC ......... 524/270, 271, 272, 273, 274, 380, 384, 524/385; 152/450, 510
See application file for complete search history.

(56) References Cited

U.S. PATENT DOCUMENTS

| | | | |
|---|---|---|---|
| 5,738,158 | A | 4/1998 | Ozawa et al. |
| 6,062,283 | A | 5/2000 | Watanabe et al. |
| 6,079,465 | A | 6/2000 | Takeyama et al. |
| 6,759,136 | B2 | 7/2004 | Kanenari et al. |
| 8,580,877 | B2 * | 11/2013 | Tsou et al. ............... 524/271 |
| 2002/0066512 | A1 | 6/2002 | Narahara et al. |
| 2008/0314492 | A1 | 12/2008 | Tsou et al. |

FOREIGN PATENT DOCUMENTS

| | | |
|---|---|---|
| EP | 1424219 A1 | 6/2004 |
| JP | 2000-238188 A | 9/2000 |
| WO | WO-2004/081099 A1 | 9/2004 |
| WO | WO-2004/081106 A1 | 9/2004 |
| WO | WO-2004/081107 A1 | 9/2004 |
| WO | WO-2004/081108 A1 | 9/2004 |
| WO | WO-2004/081116 A1 | 9/2004 |
| WO | WO-2007/050061 A1 | 5/2007 |

* cited by examiner

*Primary Examiner* — Edward Cain
(74) *Attorney, Agent, or Firm* — Novak Druce Connolly Bove + Quigg LLP

(57) ABSTRACT

A layered structure suitable for use in a pneumatic tire as an innerliner is prepared by directly bonding a fluid permeation prevention film and an adhesive tie layer. Prior to the bonding, the fluid permeation prevention layer is treated to remove any residual plasticizers or oils on the surface of the film. The tie layer comprises 100 weight % of at least one halogenated isobutylene containing elastomer and about 1 to about 20 parts per hundred (phr) of at least one tackifier. The fluid permeation prevention film comprises an elastomeric component dispersed in a vulcanized or partially vulcanized state, as a discontinuous phase, in a matrix of the thermoplastic resin component. The two layers of the layered structure may be separately extruded and then adhered to each other or adhered to each other during a calendaring operation wherein the adhesive tie layer composition is coated onto the treated film.

17 Claims, 2 Drawing Sheets

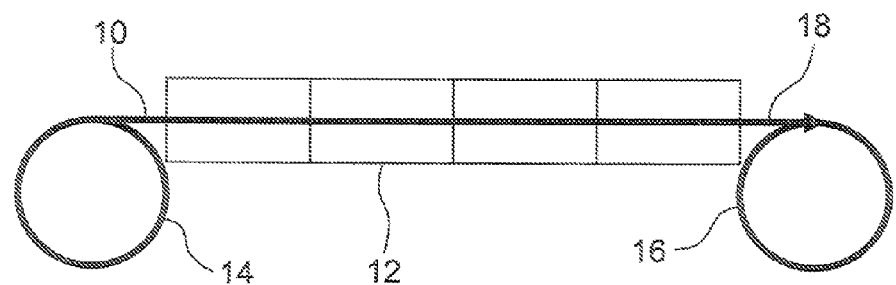
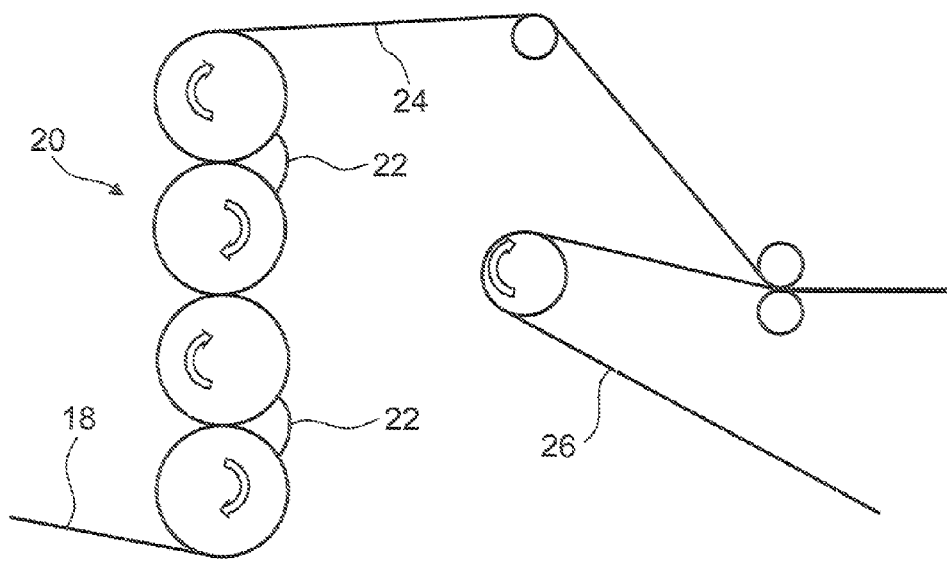

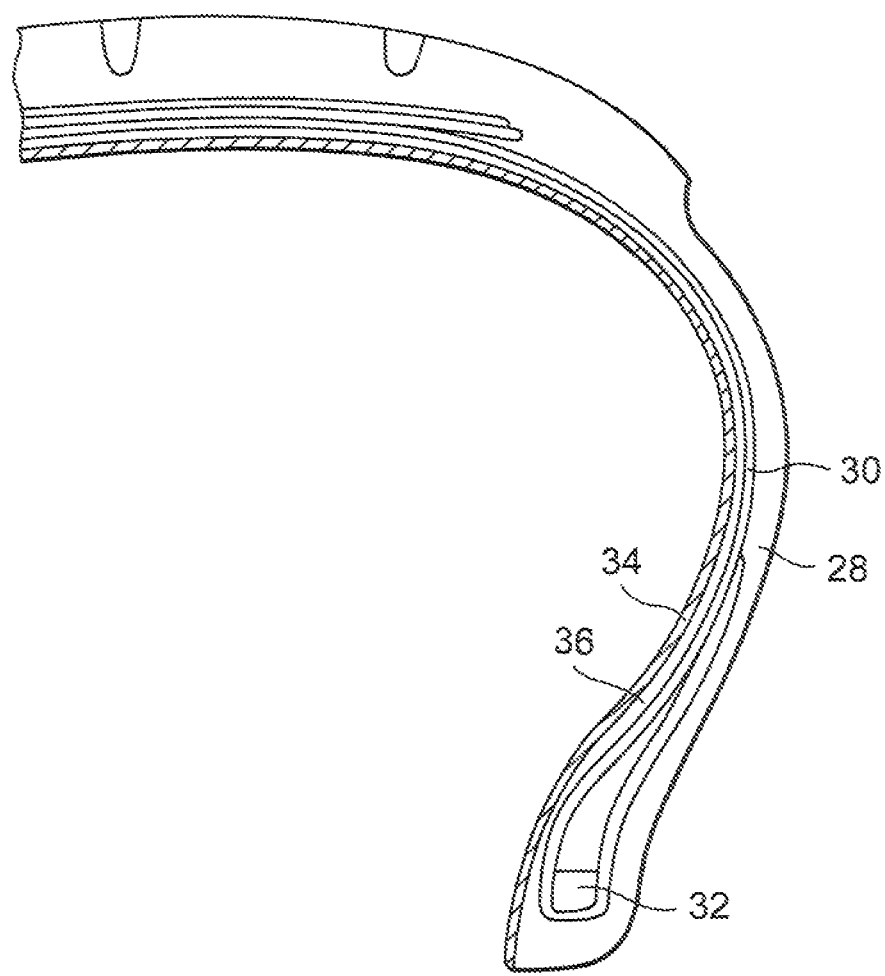

CONSTRUCTION COMPRISING TIE LAYER

CROSS-REFERENCE TO RELATED APPLICATIONS

The present application claims the benefit of PCT Application No. PCT/US2005/38705, filed on 27 Oct. 2005, and U.S. patent application Ser. No. 12/091,608, filed Oct. 26, 2006, both of which are incorporated herein by reference.

FIELD OF THE INVENTION

This invention relates to compositions useful in multilayer constructions, for example in tire construction, especially a tire tie layer between an innerliner and carcass. In particular, this invention relates to rubber compositions utilizing halogenated isobutylene-containing elastomers, optionally in blends with high diene-containing elastomer or rubber, such as natural rubber (NR) and styrene butadiene rubber (SBR).

BACKGROUND OF THE INVENTION

To prevent tire cord strike-through, a condition wherein the reinforcing tire cord penetrates the innerliner layer, leading to air leakage and tire failure, it is a common practice to add a buffer layer between the carcass layer containing textile or steel cords and the innerliner layer. This buffer layer has been referred to as tie gum, tie layer, cushion compound, or liner backing layer and typically includes blends of natural rubber (NR) and styrene-butadiene rubber (SBR). For purposes of the present invention, this tire component is referred to as the "tie layer." Typically, the composition of the tie layer is similar to the composition of the carcass compound in order to provide the necessary building tack for maintaining a coherent tire structure in the uncured, or "green," state, cured adhesion, and satisfactory dynamic properties during tire use. However, both NR and SBR are highly permeable rubbers. Consequently, a thicker cross-section would be required in order to reduce air permeability though this layer and so maintain tire pressure. In order to achieve overall weight reduction in a tire by using a thin, highly impermeable innerliner, it is necessary to find a means of reducing the cross-sectional thickness of the tie layer.

U.S. Pat. No. 5,738,158 discloses a pneumatic tire having an air permeation prevention layer or innerliner layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 85/15 or less. The resin composition can further include dispersed rubber particles wherein the rubber particles have been dynamically vulcanized. The concept of using a resin composition as an innerliner layer has been further developed by various inventors of the same assignee, see, e.g., U.S. Pat. No. 6,079,465, which claims a pneumatic tire that incorporates such an innerliner and discloses the use of various thermoplastic resins for use in the composition. This patent also discloses the presence of a tie layer and another layer to promote bond or adhesive strength of the innerliner layer in the overall structure. The further development of this technology to improve adhesion of the innerliner layer in the structure is described in U.S. Pat. No. 6,062,283 wherein melt viscosities and solubility parameters of thermoplastic resin components and elastomer components are controlled according to a specific mathematical formula.

Published application U.S. 2002/0066512 discloses a pneumatic tire comprising a carcass comprising a ply of cords defining the innermost reinforcing cord layer extending between bead portions, and an airtight layer disposed inside the cords of the carcass ply along the inner surface of the tire, covering the substantially entire inner surface of the tire, wherein the airtight layer is made of air-impermeable rubber including at least 10 weight % of halogenated butyl rubber and/or halogenated isobutylene-paramethyl styrene copolymer in its rubber base, and a thickness of the airtight layer measured from the inner surface of the tire to the cords of the carcass ply is in a range of from 0.2 to 0.7 mm. The publication also discloses that the "airtight layer," defined by a rubber layer between the tire inner surface and the innermost tire cords or carcass cords, can be a double layer comprising an inner layer of an air-impermeable rubber compound and an outer layer of a diene-based rubber which is not air-impermeable.

Alternatively, the outer layer may be of the same air-impermeable rubber compound or a similar air-impermeable rubber compound, which compound is further described in the publication as including halogenated butyl rubber and/or halogenated isobutylene-paramethyl styrene copolymer and diene rubber as well as carbon black (see paragraphs 28-34).

Other references of interest include: WO 2004/081107, WO 2004/081106, WO 2004/081108, WO 2004/081116, WO 2004/081099, JP 2000238188, EP 01 424 219, U.S. Pat. Nos. 6,759,136, and 6,079,465.

SUMMARY OF THE INVENTION

The present invention provides a solution by using at least one highly impermeable isobutylene-based elastomer in the tie layer; particularly preferred impermeable elastomers being brominated isobutylene-isoprene copolymers (BIIR), i.e., bromobutyl copolymer. The present invention is useful in tires employing thermoplastic elastomeric tire innerliner compositions based on vulcanized blends of engineering resins, e.g., polyamides and BIMS, produced, for example, using dynamic vulcanization. The tie layer is directly adhered to the dynamically vulcanized alloy layer without impairing the improved permeability characteristics achieved by the innerliner and without using additional bonding means to secure the two layers together.

One aspect of the disclosed invention is a process for forming a layered structure wherein a fluid permeation prevention film and an adhesive tie layer are directly bonded together. Prior to bonding the two layers, the fluid permeation prevention layer is treated to remove any residual plasticizers or oils on the surface of the film. The two layers of the layered structure may be separately extruded and then adhered to each other or adhered to each other during a calendering operation wherein the adhesive tie layer composition is coated onto the treated film.

In any aspect of the disclosed invention, the tie layer comprises a mixture of 100 weight % of at least one halogenated isobutylene containing elastomer and about 1 to about 20 parts per hundred (phr) of at least one tackifier.

In any aspect of the disclosed invention, the fluid permeation prevention film comprises an elastomeric component dispersed in a vulcanized or partially vulcanized state, as a discontinuous phase, in a matrix of the thermoplastic resin component.

The present invention is also useful in other applications in which an air or fluid holding layer is used in combination with another layer, particularly where the other layer includes reinforcing fibers or cords, e.g., hoses and other vessels required to retain a gas or a fluid.

BRIEF DESCRIPTION OF THE DRAWINGS

FIG. 1 is a schematic diagram of a multi-zone oven for treating the DVA film to remove the residual plasticizer;

FIG. 2 is an exemplary calendering system for application of the adhesive tie gum layer; and FIG. 3 is a simplified cross-sectional view of a tire showing the location of various layers in a tire including a tie layer.

DETAILED DESCRIPTION

The present invention relates to a rubber composition for a relatively impermeable tie layer between innerliner and carcass for tire weight reduction while maintaining the heat resistance, durability, and flexibility demanded for a pneumatic tire. The present invention is also directed to reducing the permeability of the tie layer with improved durability while achieving excellent adhesion to both the carcass and innerliner.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon. Multiolefin refers to any monomer having two or more double bonds. In a preferred embodiment, the multiolefin is any monomer comprising two double bonds, preferably two conjugated double bonds such as a conjugated diene like isoprene.

Elastomer(s) as used herein, refers to any polymer or composition of polymers consistent with the ASTM D1566-06 definition. The terms may be used interchangeably with the term "rubber(s)."

The present invention is directed to a layered construction having one layer comprising an thermoplastic engineering resin (also called an "engineering resin" or a "thermoplastic resin") as a continuous phase and a vulcanized (or partially vulcanized) elastomer as a dispersed phase. Such a composition is prepared, for example, by utilizing technology known as dynamic vulcanization and the resulting composition is known as a dynamically vulcanized alloy (DVA); details of such a composition and its method of preparation are described herein. In the context of its use in pneumatic tires, the DVA layer serves as a tire innerliner. In general, this layer will be referred as the air permeation prevention layer or barrier layer since this is the layer with the lowest permeation rate.

Adjacent to the air permeation prevention layer is an adhesive tie layer, so named because it ties the DVA innerliner to the adjacent layers in the constructed tire—typically, the adjacent layer will be the radially innermost surface of the carcass and the radially innermost coating rubber of the carcass layer. The tie layer is preferably a vulcanizable composition, typically containing at least one reinforcing filler as well as optional additives such as processing aids, etc., and, for purposes of the present invention, the tie layer comprises a halogenated isobutylene-containing elastomer.

In accordance with the present, by formulation and/or treatment of the air permeation prevention layer, the adhesive tie lay may be bonded directly to the air permeation prevention layer without requiring the use of intermediate adhesive layers between the two layers.

Fluid Permeation Prevention Layer

The fluid permeation prevention layer is typically present in the form of a sheet or a film for tire constructions, but may also be present in the form of a tubular layer of a hose construction. The sheet or film may be extruded as a blown sheet or tubular layer or cast into a film. Either method of forming the layer may result in a layer of consistent thickness or a varying thickness as desired to achieve greater thicknesses in different areas corresponding to the various areas of flexibility of the article in which it is to used.

The fluid permeation prevention layer, as noted is formed from a DVA having a vulcanized, or partially vulcanized, elastomer dispersed as discrete particles within a continuous phase of thermoplastic engineering resin.

Elastomer

The elastomers useful in the DVA of the invention are any $C_4$ to $C_7$ alkene monomer derived elastomer. One such elastomer useful in the invention is a typically prepared by reacting a mixture of monomers, the mixture having at least (1) a $C_4$ to $C_7$ alkene monomer with (2) at least one multiolefin, monomer component. The alkene is in a range from 70 to 99.5 wt % by weight of the total monomer mixture in one embodiment, and 85 to 99. 5 wt % in another embodiment. The alkene is a $C_4$ to $C_7$ compound, non-limiting examples of which are compounds such as isobutylene, 2-methyl-1-butene, 3-methyl-1-butene, 2-methyl-2-butene, 1-butene, 2-butene, hexene, and 4-methyl-1-pentene. A preferred alkene for the invention is a $C_4$ to $C_7$ isoolefin or alternatively a $C_4$ to $C_7$ isomonoolefin. A useful monomer is isobutylene resulting in isobutylene-based polymers. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Useful in the invention is an elastomer obtained by reacting 92 to 99.5 wt % of isobutylene with 0.5 to 8 wt % isoprene, or reacting 99.5 wt % to 95 wt % isobutylene with 0.5 wt % to 5.0 wt % isoprene; this isobutylene-isoprene copolymer (IIR) is conventionally referred to as butyl rubber/elastomer.

It is useful in the invention to use a halogenated rubber. Halogenated rubber is conventionally defined as a rubber having at least about 0.1 mole % halogen based on total moles of monomers and co-monomers, such halogen selected from the group consisting of bromine, chlorine and iodine. Halogenated rubbers useful in this invention include halogenated isobutylene containing elastomers (also referred to as halogenated isobutylene-based copolymers). These elastomers can be described as random copolymers of a $C_4$ to $C_7$ isomonoolefin derived unit, such as isobutylene derived unit, and at least one other polymerizable unit. In one embodiment of the invention, the halogenated isobutylene-containing elastomer is a butyl-type rubber or branched butyl-type rubber, especially brominated versions of these elastomers. Preferred halogenated isobutylene-based homopolymers or copolymers useful in this invention include halobutyl rubbers, such as bromobutyl rubber and chlorobutyl rubber.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 3,099,644, 4,513,116, and 5,681,901. In a conventional process, butyl rubber is halogenated in hexane diluent at from 4 to 60° C. using bromine ($Br_2$) or chlorine ($Cl_2$) as the halogenation agent. The halogenated butyl rubber typically has a Mooney Viscosity of about 27 to about 51 (ML 1+8 at 125° C.). The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %. A commercial embodiment of a halogenated isobutylene containing elastomer useful in the present invention is Bromobutyl 2222 (ExxonMobil Chemical Company). Its Mooney Viscosity is typically about 27 to 37 (ML 1+8 at 125° C., ASTM D1646-04, modified), and its bromine content is about 1.8 to 2.2 wt % relative to the halogenated elastomer. Furthermore, the cure characteristics of Bromobutyl 2222 as provided by the manufacturer are as follows: MH about 28 to 40 dN m, ML is about 7 to 18 dN m (ASTM D2084-92A). Another commercial embodiment of a halogenated isobutylene containing elastomer useful in the present invention is Bromobutyl 2255 (ExxonMobil Chemical Company). Its Mooney Viscosity is about 41 to 51 (ML 1+8 at 125° C., ASTM D1646-04), and its bromine content is about 1.8 to 2.2 wt %. Furthermore, its cure characteristics as disclosed by the manufacturer are as follows: MH is from 34 to 48 dN m, ML is from 11 to 21 dN m (ASTM D2084-92A).

Another useful embodiment of halogenated isobutylene containing elastomer is halogenated, branched or "star-branched" butyl rubber. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in wt %, typically greater than 0.3 wt %; alternatively, about 0.3 to about 3 wt %; or about 0.4 to 2.7 wt %.

Preferably the branched or "star-branched" butyl rubber used herein is halogenated. In one embodiment, the halogenated star-branched butyl rubber ("HSBB") comprises a butyl rubber, either halogenated or not, and a polydiene or block copolymer, either halogenated or not. The present invention is not limited by the method of forming the HSBB. The polydiene/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

A commercial embodiment of HSBB useful in the present invention is Bromobutyl 6222 (ExxonMobil Chemical Company), having a Mooney Viscosity (ML 1+8 at 125° C., ASTM D1646-04, modified) of about 27 to 37, and a bromine content of about 2.2 to 2.6 wt %. Further, cure characteristics of Bromobutyl 6222, as disclosed by the manufacturer, are as follows: MH is from 24 to 38 dN m, ML is from 6 to 16 dN m (ASTM D2084-92A).

Another elastomer useful in the invention is an isoolefin-styrenic polymer. Useful isoolefin monomers are $C_4$ to $C_7$ isoolefins such as isobutylene, 2-methyl-1-butene, 3-methyl-1-butene, 2-methyl-2-butene, and 4-methyl-1-pentene. Useful styrenic monomers in the isoolefin copolymer include styrene, alkylstyrene, alkyloxystyrene, indene and indene derivatives, and combinations thereof. The alkylstyrene may be an ortho-, meta-, or para-alkyl-substituted styrene. In one embodiment, the alkylstyrene is a p-alkylstyrene containing at least 80%, more preferably at least 90% by weight of the para-isomer. The polymer may also comprise $C_4$ to $C_{14}$ multiolefin derived units such as isoprene, butadiene, 2,3-dimethyl-1,3-butadiene, myrcene, 6,6-dimethyl-fulvene, hexadiene, cyclopentadiene, and piperylene. The polymer may also include functionalized interpolymers wherein at least some of the alkyl substituent groups present on the styrene monomer units contain halogen or another functional group described further below. These interpolymers are herein referred to as "isoolefin copolymers comprising a halomethylstyrene" or simply "isoolefin copolymer."

Such isoolefin polymers may be characterized as interpolymers containing the following monomer units randomly spaced along the polymer chain:

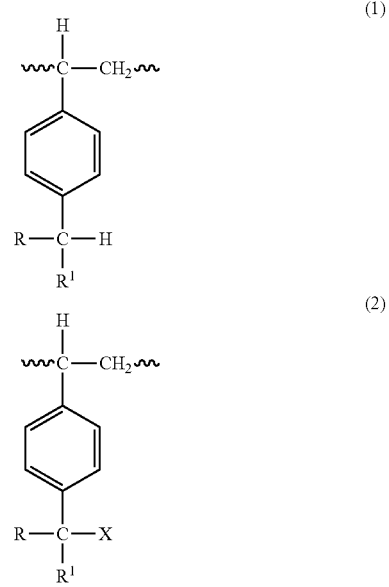

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof, preferably bromine. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Useful in the invention are copolymers of isobutylene and p-methylstyrene containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)". It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene)polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646-04, modified) is about 30 to about 60 Mooney units.

The elastomer useful in the air permeation prevention layer and the halogenated isobutylene containing elastomer useful in the tie layer may be the same or different elastomer. In a preferred embodiment, the elastomer present in the air permeation prevention layer and the halogenated isobutylene containing elastomer present in the tie layer are the same elastomer. In a preferred embodiment, the elastomer present in the air permeation prevention layer and the halogenated isobutylene containing elastomer present in the tie layer are different elastomers. Preferably, the elastomer present in the air permeation prevention layer is a brominated copolymer of isobutylene and para-methyl styrene and the isobutylene containing elastomer present in the tie layer is a brominated butyl rubber.

Thermoplastic Engineering Resin

For purposes of the present invention, the thermoplastic engineering resin (also called an "thermoplastic resin," or "thermoplastic") is defined to be any thermoplastic polymer, copolymer or mixture thereof having a Young's modulus of more than 500 MPa and, preferably, an air permeation coefficient of less than $60 \times 10^{-12}$ cc cm/cm² sec cm Hg (at 30° C.), preferably less than $25 \times 10^{-12}$ cc cm/cm² sec cm Hg (at 30° C.), including, but not limited to, one or more of the following:

a) polyamide resins: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins: vinyl acetate (EVA), polyvinyl alcohol (PVA), ethylene vinyl alcohol copolymers (EVOH), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides;

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n)

inclusive as well as mixtures of any of the illustrative or exemplified engineering resins within each of a) through n) inclusive.

For purposes of the present invention, this definition of engineering resin excludes polymers of olefins having any degree of crystallinity, such as polyethylene and polypropylene.

Preferred engineering resins include polyamide resins and mixtures thereof; particularly preferred resins include Nylon 6, Nylon 66, Nylon 6/66 copolymer, Nylon 11, and Nylon 12 and their blends.

Additional Components

Generally, elastomeric polymers, e.g., those used to produce tires, are cross-linked or vulcanized. Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed during the vulcanization reaction. Curing agents include those components described above that facilitate or influence the cure of elastomers, and generally include metals, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be cross-linked by adding curative agents, for example sulfur, metal oxides (i.e., zinc oxide, ZnO), organometallic compounds, radical initiators, etc. and heating the composition or mixture. When the method known as "dynamic vulcanization" is used, the process is modified so as to substantially simultaneously mix and vulcanize, or crosslink, at least one of the vulcanizable components in a composition comprising at least one vulcanizable rubber, elastomer or polymer and at least one elastomer or polymer not vulcanizable using the vulcanizing agent(s) for the at least one vulcanizable component. (See, e.g., U.S. Pat. No. 6,079,465 and the references cited therein). In particular, the following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkyl peroxide compound. To the curative agent(s) there are often added accelerators for the vulcanization of elastomer compositions. The curing agent(s), with or without the use of at least one accelerator, is often referred to in the art as a curing "system" for the elastomer(s). A cure system is used because typically more than one curing agent is employed for beneficial effects, particularly where a mixture of high diene rubber and a less reactive elastomer is used.

For purposes of dynamic vulcanization in the presence of an engineering resin to form the highly impermeable layer, any conventional curative system which is capable of vulcanizing saturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when the thermoplastic engineering resin(s) chosen are such that peroxide would cause these resins themselves to crosslink since the engineering resin would itself vulcanize or crosslink, thereby resulting in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux, the di-ortho-tolylguanidine salt of dicatechol borate; HVA-2 (m-phenylene bis maleimide); Zisnet, 2,4,6-trimercapto-5-triazine; ZDEDC (zinc diethyl dithiocarbamate) and also including for the purposes of the present invention, other dithiocarbamates; Tetrone A (dipentamethylene thiuram hexasulfide); Vultac 5 (alkylated phenol disulfide), SP1045-(phenol formaldehyde resin); SP1056 (brominated alkyl phenol formaldehyde resin); DPPD (diphenyl phenylene diamine); salicylic acid, ortho-hydroxy benzoic acid; wood rosin, abietic acid; and TMTDS (tetramethyl thiuram disulfide), used in combination with sulfur.

Dynamic vulcanization is conducted at conditions to vulcanize at least partially, preferably fully, the elastomeric halogen containing copolymer of the fluid (gas or liquid, preferably air) permeation prevention layer.

With reference to the polymers and/or elastomers referred to herein, the terms "cured," "vulcanized," or "cross-linked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "cross-linked." For example, for purposes of the present invention, a tire comprising the tie layer is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or cross-linked when the tire can be put to use even if additional curing time could produce additional crosslinks. With limited experimentation using known tools and standard techniques, one of ordinary skill in the art can readily determine the appropriate or optimum cure time required for the elastomer(s) and polymer(s) selected for use in the tie layer composition, as well as the amount and type of crosslinking agent(s) and accelerator(s) and the curing temperature that will be used to manufacture the tire.

Accelerators useful herein include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and cure systems useful with one or more crosslinkable polymers are well-known in the art.

In one embodiment of the invention, at least one curing agent is typically present at about 0.1 to about 15 phr; alternatively at about 0.5 to about 10 phr.

The composition described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black and the like. Reinforcing grade carbon black is most preferred. The filler may also include other reinforcing or non-reinforcing materials such as silica, clay, calcium carbonate, talc, titanium dioxide and the like. The filler is normally present in the composition (preferably the innerliner) at a level of from about 20 to about 50% by weight of the total composition, more preferably from about 25 to 40% by weight. In one embodiment, the filler is carbon black or modified carbon black. A preferred filler is semi-reinforcing grade carbon black, typically used at a level of about 10 to 150 parts per hundred of rubber, by weight (phr), more preferably about 30 to about 120 phr. Grades of carbon black useful herein include N110 to N990, as described in RUBBER TECHNOLOGY 59-85 (1995). More desirably, grades of carbon black useful in, for example, tire treads, such as N229, N351, N339, N220, N234 and N110 provided in ASTM (D3037, D1510, and D3765) are useful herein. Embodiments of carbon black useful in, for example, tire sidewalls such as N330, N351, N550, N650, N660, and N762 are particularly useful herein. Embodiments of carbon black useful in, for example, innerliners or inner tubes, such as N550, N650, N660, N762, N990, and Regal 85 (Cabot Corporation, Alpharetta, Ga.) and the like are similarly particularly useful herein.

Compatibilizers may be employed due to the difference in solubility of the thermoplastic resins and elastomers in the DVA. Such compatibilizers are thought to function by modifying, and in particular reducing, the surface tension between the rubber and thermoplastic components of the composition. Suitable compatibilizers include ethylenically unsaturated nitrile-conjugated diene-based high saturation copolymer rubbers (HNBR), epoxylated natural rubbers (ENR), acrylate rubber, and mixtures thereof, as well as copolymers having the same structure of the thermoplastic resin or the elastomeric polymer, or a structure of a copolymer having an epoxy group, carbonyl group, halogen group, amine group, maleated group, oxazoline group, or hydroxyl group capable of reacting with the thermoplastic resin or the elastomer.

The amount of compatibilizer is typically about 0.5 to about 10 parts by weight; preferably about 3 to about 8 parts by weight, based upon 100 parts by weight of the total of the elastomer.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a DVA with acceptable elastomeric dispersion sizes.

Components previously used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines. Examples include maleic anhydride-grafted ethylene-ethyl acrylate copolymers (a solid rubbery material available from Mitsui-DuPont as AR-201 having a melt flow rate of 7 g/10 min measured per JIS K6710) and butylbenzylsulfonamide (BBSA). These compounds may act to increase the 'effective' amount of thermoplastic material in the elastomeric/thermoplastic compound. The amount of additive is selected to achieve the desired viscosity comparison without negatively affecting the characteristics of the DVA. If too much is present, impermeability may be decreased and the excess may have to be removed during post-processing. If not enough compatibilizer is present, the elastomer may not invert phases to become the dispersed phase in the thermoplastic resin matrix.

The amount of plasticizer present in the DVA ranges in amounts from a minimum amount of about 2 phr, 5 phr, or 10 phr to a maximum amount of 15 phr, 20 phr, 25 phr, 30 phr, or 35 phr.

Preparation of the DVA

The term "dynamic vulcanization" is used herein to denote a vulcanization process in which the engineering resin and the rubber are mixed under conditions of high shear and elevated temperature in the presence of a curing agent. As a result, the rubber is simultaneously cross-linked and dispersed as fine particles, for example, in the form of a microgel, within the engineering resin which forms a continuous matrix; the resulting composition is known in the art as a "dynamically vulcanized alloy" or DVA. Dynamic vulcanization is effected by mixing the ingredients at a temperature which is at or above the curing temperature of the rubber using in the equipment such as roll mills, Banbury® mixers, continuous mixers, kneaders, or mixing extruders (such as twin screw extruders). The unique characteristic of the dynamically cured composition is that, notwithstanding the fact that the rubber is cured, the composition can be processed and reprocessed by conventional thermoplastic processing techniques such as extrusion, injection molding, compression molding, etc. Scrap and or flashing can also be salvaged and reprocessed.

The dynamic vulcanization process is conducted at conditions to vulcanize at least partially, preferably fully, the elastomeric halogen-containing copolymer. To accomplish this, the thermoplastic engineering resin, the elastomeric copolymer and optional other polymers, are mixed together at a temperature sufficient to soften the resin or, more commonly, at a temperature above the melting point of a crystalline or semi-crystalline resin. Preferably the cure system is premixed in the elastomer component. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is typically from about the melting point of the thermoplastic resin to about 300° C.; for example, the temperature may range from about the melting point of the matrix resin to about 275° C. Preferably, the vulcanization is carried out at a temperature range from about 10° C. to about 50° C. above the melting temperature of the matrix resin.

It is preferred that the mixing process be continued until the desired level of vulcanization or crosslinking is completed. If vulcanization is permitted to continue after mixing has stopped, the composition may not be reprocessable as a thermoplastic. However, dynamic vulcanization can be carried out in stages. For example, vulcanization can be commenced in a twin screw extruder and pellets formed of the DVA material or material using an underwater pelletizer, thereby quenching the vulcanization before it is completed. The vulcanization process can be completed at a later time under dynamic vulcanization conditions. Those of ordinary skill in the art will appreciate the appropriate quantities, types of curatives and extent of mixing time required to carry out the vulcanization of the rubber.

Where necessary or desirable to establish the appropriate concentrations and conditions, the rubber alone can be vulcanized using varying amounts of curative, which may include one or more curatives and/or accelerators, to determine the optimum cure system to be utilized and the appropriate cure conditions to achieve a substantially full cure.

While it is preferred that all components be present in the mixture prior to carrying out the dynamic vulcanization process, this is not a necessary condition. For example, it is not necessary to add all of the fillers and oil, when used, prior to the dynamic vulcanization stage. A portion or all of the fillers and oil can be added after the vulcanization is completed. Certain ingredients, such as stabilizers and process aids function more effectively if they are added after curing.

Adhesive Tie Layer

The tie layer is typically present as a sheet or film that is formed by the use of extrusion or calendering processes. The tie layer may co-extruded with the DVA or extruded or calendered onto an already formed DVA layer.

The adhesive tie layer composition comprises a mixture of: (1) 100 weight % of a halogenated isobutylene-containing elastomer; (2) about 20 to about 50 weight % of at least one filler; (3) about 0 to about 30 weight % of at least one processing oil; (4) at least about 0.1 to about 15 parts per hundred of rubber (phr) of a curing system for the elastomers; and (5) 0.1 to about 10 parts per hundred of at least one tackifier. In a preferred embodiment the halogenated isobutylene-containing elastomer is a halogen-containing random copolymer of isobutylene and a $C_4$ to $C_{14}$ multiolefin. In each instance, the halogen is selected from the group consisting of chlorine, bromine and mixtures thereof. Useful elastomers may be selected from the group consisting of chlorinated butyl rubber, brominated butyl rubber, chlorinated star branched butyl rubber, brominated star branched butyl rubber, and mixtures thereof. The selection of 100 wt % of the halogenated isobutylene-containing elastomer as the sole elastomer in the tie layer provides for low permeability in the tie layer.

Fillers useful in the tie layer include at least one filler is selected from the group consisting of carbon black, clay, exfoliated clay, intercalated clay, dispersed clay, calcium carbonate, mica, silica, silicates, talc, titanium dioxide, wood flour and mixtures thereof. Preferably, the filler is selected from the group consisting of carbon black, exfoliated clay, intercalated clay, and dispersed clay, and mixtures thereof. The amount of the at least one filler is typically about 20 to about 50 weight %; preferably about 25 to about 40 weight %; based on the total weight of the tie layer composition.

The tie layer optionally includes a rubber process or plasticizer oil. As used herein, the term "process oil" means both the petroleum derived process oils and synthetic plasticizers. Such oils are primarily used to improve the processing of the composition during preparation of the layer, e.g., mixing, calendering, etc. Generally, the process oil may be selected from paraffinic oils, aromatic oils, naphthenic oils, and polybutene oils. Polybutene process oil is a low molecular weight (less than 15,000 Mn) homopolymer or copolymer of olefinderived units having from about 3 to about 8 carbon atoms, more preferably about 4 to about 6 carbon atoms. In another embodiment, the polybutene oil is a homopolymer or copolymer of a $C_4$ raffinate.

Preferred polybutene processing oils are typically synthetic liquid polybutenes having a certain molecular weight, preferably from about 420 Mn to about 2700 Mn. The molecular weight distribution—Mw/Mn—("MWD") of preferred polybutene oils is typically about from 1.8 to about 3, preferably about 2 to about 2.8. The preferred density (g/ml) of useful polybutene processing oils varies from about 0.85 to about 0.91. The bromine number (CG/G) for preferred polybutene oils ranges from about 40 for the 450 Mn process oil, to about 8 for the 2700 Mn process oil.

Rubber process oils also have ASTM designations depending on whether they fall into the class of paraffinic, naphthenic or aromatic hydrocarbonaceous process oils. The type of process oil utilized will be that customarily used in conjunction with a type of elastomer component and a rubber chemist of ordinary skill in the art will recognize which type of oil should be utilized with a particular rubber in a particular application.

Suitable plasticizer oils include aliphatic acid esters or hydrocarbon plasticizer oils such as paraffinic or naphthenic petroleum oils or polybutene oils.

In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 1 phr in the composition. In still another embodiment, naphthenic, aliphatic, paraffinic and other aromatic oils are present at less than 2 phr.

The amount of the rubber process oil or plasticizer oil is typically about 0 to about 30 weight %; preferably about 0 to about 20 weight %; more preferably about 0 to about 10 weight %, based on the total weight of the tie layer composition. Preferably, the process oil is a naphthenic or polybutene type oil.

The adhesive tie layer is cured or vulcanized using a cure system comprising at least one curing agent and at least one accelerator useful for the halogenated isobutylene-containing elastomers comprising the composition. The cure system for the adhesive tie layer includes all the above identified curing agents and accelerators already described above as useful in the DVA. The cure systems in the DVA and the tie layer may or may not be identical; but should be compatible due to interlayer transfer of the cure system components from one layer to the adjacent layer when the layers are adjacent to each other during formation and subsequent article construction and article curing. Typically, the cure system is present in the amount of at least about 0.1 to about 15 parts per hundred of rubber (phr), although, as one of ordinary skill in the art will know, the specific amount of the cure system is not limited and the amount used will depend, in large measure, on the particular components of the cure system selected.

Further optional, useful additives are typically added at a level of less than about 10 phr and can be selected from the group consisting of pigments, antioxidants, antiozonants, processing aids, compound compatibilizers, and the like and mixtures thereof. Such optional additives can be included at the discretion of the compounder in order to achieve a particular advantage in the composition, e.g., the use of a tackifier to improve contact adhesion during tire building or an antioxidant to improve heat aging characteristics of the cured composition.

In a preferred embodiment at least one tackifier is included in the tie layer composition. For purposes of the present invention, a tackifier includes materials identified as rosins or rosin derivatives as well as various derivatives such as acetylene-phenolic compounds that are known as tackifiers for elastomer or polymer containing compositions. Particularly useful tackifiers include condensation products of butyl phenol and acetylene, such as acetylene-p-tert-butyl phenol, available commercially as "Koresin" (BASF) and rosin tackifier available commercially as "MR1085A" (Mobile Rosin Oil Company, Mobile, Ala.), a blend of tall oil rosin and fatty acids. Some tackifiers are designated as particularly useful for imparting tack to specific polymers or elastomers, but it may be determined that they are also useful for compounds of the present invention.

Tackiness generally refers to the ability of an uncured rubber compound to stick to itself or to another compound when the compounds are contacted using a relatively short dwell time and only a moderate amount of pressure ("Rubber Technology: Compounding and Testing for Performance," J.

S. Dick, Ed., 42, 2001). The dwell time and pressure are often determined by the equipment used for that purpose and by the potential for a sheet of the uncured composition to be damaged by excessive pressure and dwell time. Tack can also be affected by the solubility of the various rubber components in one another as well as in the overall composition. In some instances, a component of the composition may diffuse to the surface of a calendered or extruded sheet or film and either interfere with tack, for example, if it is an inorganic particulate (sometime referred to as "bloom"). On the other hand such diffusion may improve tack, for example, if the diffusing component is a one that itself exhibits tack. It is appreciated by those skilled in the art that tack is a difficult property to measure and, at times one skilled in the art may be required to determine if a composition has achieved a sufficient level of tack by evaluating performance of the composition(s) in a factory trial or environment in which the end product is produced. In the present case, that will typically involve actual tire building and a determination of whether the tie layer exhibits sufficient tire building tack so that the uncured tire construction will hold together during the tire building stage and during initial stages inflation during vulcanization until the structure achieves a sufficient level of cure and, consequently, cured adhesion of the various tire layers to one another; including adhesion of the tie layer to those layers that with which it is in proximate contact, including, for example, the carcass layer and the innerliner layer. There are no standardized test procedures for measuring tack of rubber compounds, but a widely used instrument is the "Tel-Tak Tackmeter," introduced by Monsanto in 1969. Another test instrument is the PICMA tack tester made by Toyo Seiki Seisakusho (Japan).

In a preferred embodiment of the present invention, at least one tackifier is added to the tie layer composition at a concentration of about 1 phr to about 20 phr; preferably about 2 phr to about 18 phr; more preferably about 3 phr to about 16 phr; for example, about 4 phr to about 14 phr. Alternatively, the at least one tackifier is typically used at a level of about 15 phr or less; preferably about 12 phr or less; more preferably about 10 phr or less; still more preferably about 9 phr or less; most preferably about 8 phr or less; such as, for example, about 1 phr to about 10 phr; about 1 phr to about 9 phr; about 2 phr to about 9 phr; about 2 phr to about 8 phr; about 2 phr to about 7 phr and the like, including individual values and ranges including each of the values, in phr, of about 1, 2, 3, 4, 5, 6, 7, 8, 9, and 10. Similarly, where a mixture of tackifiers is used, such as for example two tackifiers of the same or different chemical type, each of the tackifiers can be present in equal amounts or in amounts that are not equal, the total amount of tackifier used preferably constrained by the total amounts recited immediately above.

The adhesive tie layer composition can be prepared using mixing equipment such as Banbury mixers, mill roll mixers, extruder mixers and the like, individually and in combination in order to mix the elastomers, filler(s), processing oil and other additives as well as to disperse the cure system components. Typically, the ingredients other than the cure system components are mixed at elevated temperature and high shear to obtain satisfactory dispersion of all non-elastomeric components into the elastomers and of the elastomers in one another. After such a mixing step, the composition absent the cure system components, sometimes referred to as a masterbatch, is cooled to a lower temperature using, e.g., a rubber mill or a lower temperature, lower shear section of a mixing extruder or an internal mixer and the cure system components are dispersed into the masterbatch. The temperature for mixing curatives is typically less than about 120° C., preferably less than about 100° C.

The adhesive tie layer composition can be formed into a layer suitable for the end use application, using, for example, an extruder or a calender. Where convenient or useful, extrusion can include the use of equipment allowing for the dual or multiple extrusion of the fluid (preferably air) permeation prevention layer and the adhesive tie layer. Alternatively, the adhesive tie layer may be prepared by calendering the compounded rubber composition into sheet material having the desired thickness and cutting the sheet material into strips of appropriate width and length for innerliner application in a particular size or type tire.

In the invention, the tie layer is prepared for use in a tire construction and has a thickness that is typically about 5 mm or less; preferably about 2.5 mm or less; more preferably about 1.0 mm or less, about 0.9 mm or less, or about 0.8 mm or less; even more preferably about 0.2 to about 2.0 mm; most preferably about 0.2 to about 1.5 mm or about 0.2 mm to about 0.8 mm; for example about 0.3 to about 0.9 mm. The thickness of the tie layer for use in a hose construction can be the same or different depending on the application in which the hose will be employed. For example, an unreinforced, low pressure hose can have different performance requirements than a high pressure, reinforced hose and, similarly, a hose intended for use with a liquid can differ from one for use with a gas. Adjustment of the thickness is within the skill of the product designer, engineer or chemist, based, if necessary, on limited experimentation.

Layered Composition/Laminate Structure

After the DVA has been mixed to achieve the desired composition and morphology, it is typical to pass the material thru a pelletizer to form DVA pellets. These pellets are then supplied to a film extruder to prepare an extruded/blown film or a mixer to prepare a cast film. In accordance with the present invention, the DVA is extruder or cast by itself; i.e., the sheet is not co-extruded with an adhesive film layer to create addition adhesion between the DVA and the adhesive tie layer.

After the DVA film is formed, the film is treated to remove any residual plasticizer or oils; in the present invention, "residual plasticizer or oils" are defined as plasticizer or oils that have not been grafted into the DVA during mixing in the extruder or during preparation of the film and which, due to the thinness of the film, are present on the film surfaces. The removal of the residual plasticizer/oils is done to obtain a film that is substantially free of any plasticizer/oils present on the film surface wherein 'substantially free' is defined as less than 0.1 wt % of plasticizer on the film.

One method of removing plasticizer/oils from the DVA film is by exposure to heat to flash, evaporate, sublime, and/or oxidize the plasticizer from at least one surface of the film. This can be accomplished by heating the film for a residence time at a temperature no higher than 15° or 10° or 5° or 1° C. above the flash point of the plasticizer/oil and then cooling the DVA film to form a heat-treated film having a level of plasticizer less than the level of plasticizer in the originally prepared DVA film. Desirably, the film is exposed to oxygen during the heating step. In any embodiment of the invention, a continuous or substantially continuous current of gas is blown over the continuous elastomeric length while being heated. The gas may be air, nitrogen/oxygen mixture, or other gas with an oxidizer mixed therein.

FIG. 1 shows a method of treating the DVA film to remove the residual plasticizer. The DVA film 10 is passed through a multi-zone oven 12. The DVA film 10 is unwound off of rolls 14 and rewound onto rolls 16. The multi-zone oven 12 is illustrated with four zones; however, the number of actual zones useful in the invention may vary from 2 to 10 zones. By employing zones in the oven 12, the temperature of the DVA material may be gradually raised or lowered to achieve either immediate or delayed removal of the residual plasticizer/oils, as well as provide any desired gradual cooling of the DVA film. In any embodiment of the invention, flashing of the plasticizer/oils occurs in zone N-2 wherein N is the total number of zones in the oven 12 and the zones are counted in order from entry to exit of the film 10.

The rewind roll 16 is illustrated as being immediately adjacent to the exit of the oven 12; however, it will be appreciated by those in the art that if the treated reduced plasticizer film 18 has not reached a sufficiently cooled down temperature to permit rewinding of the film 10, additional take up and wrap rolls, as well as other conventional cool-down means, may be employed.

Alternatively, instead of the reduced plasticizer film 18 being rewound onto rolls 16, the film 18 may be sent to calendering operation for application of the adhesive tie gum layer. An exemplary calendering system for application of the adhesive tie gum layer is illustrated in FIG. 2; as calendering applications are well known, one skilled in the art would appreciate that a variety of calendering systems may be useful in the present invention and the invention is not limited by the illustrated system. The DVA film 18 is passed around a bank 20 of calender rolls. As the DVA film 18 passes through several of the nips created by adjacent rolls, it passed under a set of pencil banks 22 containing the adhesive tie layer composition. The rolls are adjacent to obtain the desired thickness to the adhesive tie layer.

The rolls in calender bank 20 are heated to warm up the DVA film 18 and to ensure that the adhesive tie layer composition in the pencil banks 22 is of a sufficient temperature to permit the elastomeric composition to flow and smoothly coat the DVA film. The temperature and pressure of the rolls in the bank 20 should be sufficient to cause a degree of bonding between the DVA film 18 and the adhesive tie composition. The temperature of the rolls may vary from 50° C. to 150° C., preferably from 65° C. to 85° C. The temperature should remain below the vulcanization temperature of the tie layer composition to prevent any curing of the adhesive tie layer composition.

The film exits the calender bank 20 as a tie layer coated film 24 (this may also be referred to as a DVA laminate). For ease of windup, due to the tacky nature of the adhesive tie composition, an optional handling film 26 may be applied to the coated film 24 to prevent the DVA laminate 24 from adhering to itself during subsequent roll windup and storage. Prior to use of the DVA laminate 24, if present, the handling film is removed from the DVA laminate 24.

The compositions of the present invention and layered structures formed using such compositions can be used in tire applications; tire curing bladders; air sleeves, such as air shock absorbers, diaphragms; and hose applications, including gas and fluid transporting hoses.

FIG. 3 is a semi-cross-sectional view along the meridian direction of a tire 28 illustrating a typical example of the arrangement of an air permeation prevention or innerliner layer of a pneumatic tire. At least one carcass layer 30 spans between the left and right bead cores 32 (note that, since only one-half of the symmetrical cross-section view is included for simplicity, the second bead core is not illustrated). On the tire inner surface, inside of the carcass layer 30 there is provided an innerliner layer 34. Interposed between the innerliner layer 34 and the carcass layer 30 is the adhesive tie layer 36. The adhesive tie layer 36 facilitates the adhesion and air holding qualities of the DVA air permeation prevention layer to the inner surface of the tire. The surface of the tie layer 36 opposite the surface that is in contact with the innerliner layer 34 is in direct contact with the innermost carcass layer 30, or more particularly, the adhesive tie layer 36 is in direct contact with the radially innermost coating compound of the innermost carcass layer 30.

The pneumatic tire is also comprised of an outer surface which includes the tread, belt structure composed of multiple layers, and sidewall elements, and possible intermediate carcass layer which comprises a number of plies containing tire reinforcing fibers, (e.g., rayon, polyester, nylon or metal fibers) embedded in a rubbery matrix. Variations it the tread, belt, and carcass layers, as well as the size of the tire (i.e., overall diameter and sidewall height) are permissible and are not limited by the present invention. Tires are normally built on a tire forming drum using the layers described above. After the uncured tire has been built on the drum, it is removed and placed in a heated mold. The mold contains an inflatable tire shaping bladder that is situated within the inner circumference of the uncured tire. After the mold is closed the bladder is inflated and it shapes the tire by forcing it against the inner surfaces of the closed mold during the early stages of the curing process. The heat within the bladder and mold raises the temperature of the tire to vulcanization temperatures. Vulcanization temperatures are typically about 100° C. to about 250° C.; preferably about 150° C. to about 200° C. Cure time may vary from about one minute to several hours; preferably from about 5 to 30 minutes. Cure time and temperature depend on many variables well known in the art, including the composition of the tire components, including the cure systems in each of the layers, the overall tire size and thickness, etc. Vulcanization parameters can be established with the assistance of various well-known laboratory test methods, including the test procedure described in ASTM D2084-01, (Standard Test Method for Rubber Property-Vulcanization Using Oscillating Disk Cure Meter) as well as stress-strain testing, adhesion testing, flex testing, etc. Vulcanization of the assembled tire results in complete or substantially complete vulcanization or crosslinking of all elements or layers of the tire assembly, i.e., the innerliner, the carcass and the outer tread and sidewall layers. In addition to developing the desired strength characteristics of each layer and the overall structure, vulcanization enhances adhesion between these elements, resulting in a cured, unitary tire from what were separate, multiple layers.

As discussed in detail above, the innerliner layer exhibits advantageously low permeability properties and preferably comprises a dynamically vulcanized composition comprising an engineering resin, particularly polyamide, and a halogenated isobutylene-para-methylstyrene copolymer. Furthermore, as a consequence of the unique composition of the tie layer based on a vulcanizable halogenated isobutylene elastomer, in particular its low air permeability property and ability to generate high vulcanized adhesion to the innerliner layer surface in which it is in contact, allows for the use of a thin tie layer compared to compositions containing primarily high diene rubber. The resulting overall structure based on such innerliner and tie layers allows for a tire construction (as well as other constructions comprising an air or fluid holding layer and tie layer) having reduced weight. Typically about 2% to about 16% weight savings can be realized; alternatively, about 4% to about 13% weight savings. Such improvements are particularly meaningful in an application such as pneumatic tires.

The following examples are provided as specific illustrations of embodiments of the claimed invention. It should be understood, however, that the invention is not limited to the specific details set forth in the examples. Furthermore, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_u$, is disclosed, any number R falling within the range is specifically disclosed. In particular, the following numbers R within the range are specifically disclosed: $R=R_L+k(R_u-R_L)$, where k is a variable ranging from 1% to 100% with a 1% increment, e.g., k is 1%, 2%, 3%, 4%, 5% ... 50%, 51%, 52% .... 95%, 96%, 97%, 98%, 99%, or 100%. Moreover, any numerical range represented by any two values of R, as calculated above is also specifically disclosed.

EXAMPLES

Compositions and samples were prepared according to the following examples. The amount of each component used is based on parts per hundred rubber (phr) present in the composition. The following commercially available products were used for the components employed in the compositions of the examples:

TABLE 1

| Components | Description |
|---|---|
| | Elastomers |
| BIIR | Bromobutyl ™ 2222 (brominated isobutylene-isoprene copolymer, 2% Br, ExxonMobil Chemical Company, Houston Texas) |
| BIMS | Brominated isobutylene p-methylstyrene copolymer, 1.2 mol % Br, 7.5 wt % PMS |
| BIMS-2 | Brominated isobutylene p-methylstyrene copolymer, 0.75 mol % Br, 5 wt % PMS |
| NR | Natural Rubber: SMR-20, Standard Malaysian Rubber |
| SBR | Styrene-butadiene rubber, 23.5% bound styrene: Capo 1502, DSM |
| | Cure System Components |
| ZnO | Zinc oxide |
| St-acid | Stearic acid |
| ZnSt | Zinc stearate |
| S | Sulfur |
| MBTS | 2,2'-benzothiazyldisulfide; sulfur-containing cure accelerator |
| | Elastomeric Additive components |
| Struktol 40MS | Compatibilizer: mixture of dark aromatic hydrocarbon resins, Struktol Company |
| Process Oil | naphthenic processing oil: Calsol 810, Calumet Lubricants |
| Flectol | Flectol TMQ antioxidant: polymerized 1,2-dihydro-2,2,4-trimethylquinoline, Flexsys America |
| N660 | semi-reinforcing grade carbon black |
| N351 | semi-reinforcing grade carbon black |
| T1 | alkyl phenolformaldehyde resin: SP1068 Schenectady International |
| T2 | brominated octylphenol resin: SP1055 Schenectady International |
| T3 | Compound of rosin acid: MR1085A, Mobil Rosin Oil Company |
| T4 | Acetylene-p-tert-butyl phenol condensation product: Koresin, BASF |

TABLE 1-continued

| Components | Description |
|---|---|
| | Engineering Resin Component |
| N6/66 | Nylon 6/66 copolymer available as Ube 5033B from Ube |
| | Engineering Resin Additive Components |
| Plasticizer | N-butylbenzenesulfonamide, BM-4, Daihachi Chemical Ind. |
| Compatibilizer | maleated ethylene vinylacetate (EVA) copolymer, AR201, DuPont-Mitsui |
| Stabilizer | package includes Irganox, Tinuvin, and Copper Iodide(CuI) |

The testing methods used to evaluate the following samples are set forth in Table 2.

TABLE 2

| | |
|---|---|
| Tensile Strength (UTS) (MPa) | ISO-37 ASTM D412 Samples press cured, 5 minutes @ 207° C., 2 mm thickness |
| Elongation at break (%) | ISO-37 ASTM D412 |
| 300% Modulus (MPa) | ISO-37 ASTM D412 |
| Hardness Shore A | ASTM D2240 |
| Tear Strength N/m | ASTM D624 |
| Peel Adhesion | Force required to separate the two layers at 23° C. |

A DVA of thermoplastic elastomeric having the composition as set forth in Table 3 was prepared. The elastomer component and vulcanization system were charged into a first kneader, mixed for approximately 3.5 minutes, and dumped out at about 90° C. to prepare an accelerated elastomer component with a vulcanization system. The mixture was then pelletized by a rubber pelletizer. Next, the pelletized elastomer and resin components were charged into a twin screw mixing extruder and dynamically vulcanized to prepare a thermoplastic elastomer composition. The DVA was prepared according to the procedure described in EP 0 969 039, with specific reference to the section entitled "Production of Thermoplastic Elastomer Composition." The vulcanization in the twin-screw extruder was done at 230° C. After the DVA was prepared and pelletized, it was then sent to a film blowing operation wherein the DVA was extruded as a extruded thin film. In accordance with the present invention, the DVA film was not co-extruded with an adhesive coating; the DVA film was adhesive free.

TABLE 3

| Component | Amount, phr |
|---|---|
| BIMS | 100 |
| ZnO | 0.15 |
| St-acid | 0.60 |
| ZnSt | 0.30 |
| N6/66 | 66.53 |
| Plasticizer | 23.4 |
| Compatibilizer | 10 |
| Stabilizer | 0.5 |

After the DVA film was co-extruded as a film, the residual plasticizer was removed via a heating operation as discussed above to produce a DVA film free of residual plasticizer/oils on the surfaces of the film.

Adhesive tie layer compositions and an exemplary carcass compound were prepared as described above for conventional elastomer compounding. The compositions are set forth in Table 4 below. All component amounts in Table 4 are parts per hundred rubber (phr).

TABLE 4

| Compound | T1 | T2 | T3 | T4 | Carcass |
|---|---|---|---|---|---|
| BIIR | 100.00 | 100.00 | 100.00 | 100.00 | — |
| NR | — | — | — | — | 70 |
| SBR | — | — | — | — | 30 |
| N660 | 60.00 | 60.00 | — | — | 60 |
| N351 | — | — | 40.00 | 40.00 | — |
| Flectol | — | — | — | — | 1 |
| Process Oil | 8.00 | 8.00 | — | — | 10 |
| Struktol 40MS | 7.00 | — | 4.00 | 4.00 | — |
| St-acid | 1.00 | 2.00 | 2.00 | 2.00 | 2 |
| ZnO | 1.00 | 3.00 | 3.00 | 3.00 | 3 |
| MBTS | 1.25 | 1.50 | 1.50 | 1.50 | — |
| Sulfur | 0.50 | 0.50 | 0.50 | 0.50 | 2 |
| T1 | 4.00 | — | 5.00 | 5.00 | 5 |
| T2 | — | — | 2.00 | 2.00 | — |
| T3 | — | 6.00 | — | 6.00 | — |
| T4 | — | 6.00 | 6.00 | 6.00 | — |
| Total tackifiers, phr | 4.00 | 12.00 | 13.00 | 19.00 | 5.00 |
| Properties | | | | | |
| Tensile Strength | 9.69 | 8.64 | 11.33 | 11.01 | — |
| Elongation | 800 | 778 | 718 | 792 | — |
| 300% Modulus | 2.88 | 3.53 | 3.72 | 3.58 | — |
| Shore A | 47 | 55 | 55 | 63 | — |
| Tear Resistance | 48.55 | 47.53 | 57.39 | 57.33 | — |
| Peel Adhesion/Resistance N/mm | | | | | |
| To Self | 0.37 | 1.09 | 0.11 | 0.73 | — |
| To DVA film | 13.51 | 11.20 | 7.76 | 8.64 | — |
| To ply compound | 19.04 | 19.03 | 18.96 | 20.25 | — |

All of the adhesive tie layers showed an excellent adhesion to the treated DVA layer when directly bonded to the DVA film. In the peel adhesion testing, as the amount of tackifier in the adhesive tie layer increased, the bond between the adhesive tie layer and the DVA film actually decreased, while the bond between the adhesive tie layer and the ply compound was relatively comparable for all of the adhesive compositions. In comparison to other DVA laminate constructions, such as those disclosed in U.S. Patent Application 2008/314492, the above data shows that it is not necessary to employ multiple tackifiers in the tie gum layer, even in the absence of a thin film adhesive layer, if the DVA is treated to remove residual plasticizer/oils.

Thus, in accordance with the present invention, it is not required to use a thin film adhesive layer between the DVA film and the tie gum layer to achieve excellent adhesion for a DVA containing laminate. Removal of the residual plasticizer and/or oils from the DVA film permits the adhesive tie layer to bond more readily with the DVA film and thereby improved adhesion of the DVA film in an article. More particularly, due to improved adhesion tires containing the bonded, treated DVA film will have improved durability.

It is hereby claimed:

1. A process for fabricating a laminate structure comprising the following steps:
   (A) forming an adhesive tie composition comprising a mixture of:
      (1) 100 weight % of at least one halogenated isobutylene-containing elastomer;
      (2) about 20 to about 50 weight % of at least one filler;
      (3) about 0 to about 30 weight % of at least one processing oil;
      (4) about 1 to about 20 parts per hundred (phr) of at least one tackifier; and
      (5) about 0.1 to about 15 parts per hundred of rubber (phr) of a curing system for said elastomers;
   (B) forming a fluid permeation prevention composition comprising:
      (1) at least 10% by weight, based on the total weight of the polymer composition, of at least one thermoplastic engineering resin component having a Young's modulus of more than 500 MPa, where the thermoplastic engineering resin component is selected from the group consisting of polyamide resins, polyester resins, polynitrile resins, polymethacrylate resins, polyvinyl resins, cellulose resins, fluororesins, and imide resins,
      (2) at least 10% by weight, based on the total weight of the polymer composition, of at least one elastomer component having a Young's modulus of not more than 500 MPa, where the elastomer component is selected from the group consisting of diene rubbers, halogen-containing rubbers, silicone rubbers, sulfur-containing rubbers, and fluoro-rubbers, and
      (3) 2 to 30 parts per hundred rubber, based on component (2), of a plasticizer
      wherein the thermoplastic engineering resin, the elastomer, and the plasticizer are mixed under dynamic vulcanization conditions to disperse the elastomer as a discontinuous phases in a continuous matrix of the thermoplastic engineering resin;
   (C) forming a film of the fluid permeation prevention composition;
   (D) treating the fluid permeation prevention film to remove residual plasticizers or oils from the surfaces of the film to form a treated film; and
   (E) directly coating one surface of the treated film with the adhesive tie composition to form the laminate structure.

2. The process of claim 1 wherein the adhesive tie composition is calendered or extruded onto the surface of the treated film.

3. The process of claim 1 wherein step (E) occurs under conditions of heat and pressure to bond the treated film and the adhesive tie composition together.

4. The process of claim 1 wherein component (1) of the adhesive tie composition is (i) a halogen-containing random copolymer of a $C_4$ to $C_7$ isomonoolefin and a para-alkylstyrene, said para-alkylstyrene comprising about 0.5 to about 20 weight percent of said copolymer, or (ii) a halogen-containing random copolymer of a $C_4$ to $C_{12}$ isomonoolefin and a $C_4$ to $C_{14}$ multiolefin; in each instance, said halogen selected from the group consisting of chlorine, bromine and mixtures thereof.

5. The process of claim 1 wherein said at least one elastomer component of the fluid permeation prevention composition is selected from the group consisting of a halide of a $C_4$ to $C_7$ isomonoolefin and p-alkylstyrene copolymer, brominated isobutylene p-methylstyrene copolymer, hydrogenated nitrile-butadiene rubber, acrylonitrile butadiene rubber, chlorosulfonated polyethylene, chlorinated polyethylene, epichlorohydrin rubber, chlorinated butyl rubber, and brominated butyl rubber.

6. The process of claim 1 wherein said at least one tackifier comprises at least one member selected from the group consisting of rosin, rosin derivatives, condensate of tert-butyl phenol and acetylene, and mixtures thereof.

7. The process of claim 1 wherein said at least one tackifier comprises a mixture of at least two members selected from the group consisting of rosin, rosin derivatives, condensate of tert-butyl phenol and acetylene, and mixtures thereof.

8. A vulcanizable layered composition of two directly adjacent layers wherein the first layer of the two layers comprises a fluid permeation prevention layer, the second layer of the two layers comprises a mixture of:
- (1) 100 weight % of at least one halogenated isobutylene containing elastomer;
- (2) about 20 to about 50 weight % of at least one filler;
- (3) about 0 to about 30 weight % of at least one processing oil;
- (4) about 1 to about 20 parts per hundred of at least one tackifier; and
- (5) about 0.2 to about 15 parts per hundred of rubber of a curing system for the elastomers;

wherein said fluid permeation prevention layer comprises a polymer composition a Young's modulus of 1 to 500 MPa, said polymer composition comprising:
- (A) at least 10% by weight, based on the total weight of the polymer composition, of at least one thermoplastic engineering resin component having a Young's modulus of more than 500 MPa, where the thermoplastic engineering resin component is selected from the group consisting of polyamide resins, polyester resins, polynitrile resins, polymethacrylate resins, polyvinyl resins, cellulose resins, fluororesins, and imide resins,
- (B) at least 10% by weight, based on the total weight of the polymer composition, of at least one elastomer component having a Young's modulus of not more than 500 MPa, where the elastomer component is selected from the group consisting of diene rubbers, halogen-containing rubbers, silicone rubbers, sulfur-containing rubbers, and fluoro-rubbers, and
- 2 to 30 parts per hundred rubber, based on component (B), of a plasticizer, and
  - where the total amount of the component (A) and the component (B) is not less than 30% by weight based on the total weight of the polymer composition, wherein the elastomer component (B) is dispersed in a vulcanized or partially vulcanized state, as a discontinuous phase, in a matrix of the thermoplastic resin component (A) in the polymer composition and
  - wherein said fluid permeation prevention layer has been treated to remove residual plasticizer from the surfaces of the layer.

9. The composition of claim 8 wherein component (1) is (i) a halogen-containing random copolymer of a $C_4$ to $C_7$ isomonoolefin and a para-alkylstyrene, said para-alkylstyrene comprising about 0.5 to about 20 weight percent of said copolymer, or (ii) a halogen-containing random copolymer of a $C_4$ to $C_{12}$ isomonoolefin and a $C_4$ to $C_{14}$ multiolefn; in each instance, said halogen selected from the group consisting of chlorine, bromine and mixtures thereof.

10. The composition of claim 8 wherein said at least one elastomer component B is selected from the group consisting of a halide of a $C_4$ to $C_7$ isomonoolefin and p-alkylstyrene copolymer, brominated isobutylene p-methylstyrene copolymer, hydrogenated nitrile-butadiene rubber, acrylonitrile butadiene rubber, chlorosulfonated polyethylene, chlorinated polyethylene, epichlorohydrin rubber, chlorinated butyl rubber, and brominated butyl rubber.

11. The composition of claim 8 wherein said at least one tackifier comprises at least one member selected from the group consisting of rosin, rosin derivatives, condensate of tert-butyl phenol and acetylene, and mixtures thereof.

12. The composition of claim 8 wherein said at least one tackifier comprises a mixture of at least two members selected from the group consisting of rosin, rosin derivatives, condensate of tert-butyl phenol and acetylene, and mixtures thereof.

13. The composition of claim 8, wherein said fluid permeation prevention layer has an air permeation coefficient of $25\times10^{-12}$ cc cm/cm$^2$ sec cmHg (at 30° C.) or less, and said at least one thermoplastic engineering resin of said polymer composition has an air permeation coefficient of $25\times10^{-12}$ cc-cm/cm sec cmHg (at 30° C.) or less and said at least one elastomer of said polymer composition has an air permeation coefficient of more than $25\times10^{-12}$ cc-cm/cm$^2$ sec cmHg (at 30° C.) or less.

14. The composition of claim 8 suitable for use in a tire wherein said layer comprising at least one engineering resin is an innerliner layer.

15. A pneumatic tire comprising:
- (i) an air permeation prevention layer comprising a polymer composition having an air permeation' coefficient of about $25\times10^{-12}$ cc-cm/cm$^2$ sec cmHg (at 30° C.) or less and a Young's modulus of about 1 to about 500 MPa, said layer of said polymer composition comprising:
  - (A) at least 10% by weight, based on the total weight of the polymer composition, of at least one thermoplastic resin component having an air permeation coefficient of about $25\times10^{-12}$ cc cm/cm$^2$ sec cmHg (at 30° C.) or less and a Young's modulus of more than 500 MPa, the resin component is selected from the group consisting of polyamide resins, polyester resins, polynitrile resins, polymethacrylate resins, polyvinyl resins, cellulose resins, fluororesins, and imide resins,
  - (B) at least 10% by weight, based on the total weight of said polymer composition, of at least one elastomer component having an air permeation coefficient of more than about $25\times10^{-12}$ cc-cm/cm$^2$ sec cmHg (at 30° C.) and a Young's modulus of not more than 500 MPa, the elastomer component is selected from the group consisting of diene rubbers, halogen-containing rubbers, silicone rubbers, sulfur-containing rubbers, and fluoro-rubbers, and
  - (C) 2 to 30 parts per hundred rubber, based on component (B), of a plasticizer, and
  - where the total amount (A)+(B) of the component (A) and the component (B) being not less than about 30% by weight based on the total weight of said polymer composition, wherein the elastomer component (B) is dispersed in a vulcanized state, as a discontinuous phase, in a matrix of the thermoplastic resin component (A) in said polymer composition; and
  - wherein the air permeation prevention layer is substantially free of residual plasticizers; and
- (ii) an adhesive tie layer directly contacting the air permeation prevention layer, said tie layer comprising a mixture of:
  - (1) 100 weight % of at least one halogenated isobutylene-containing elastomer;
  - (2) about 20 to about 50 weight % of at least one filler;
  - (3) about 0 to about 30 weight % of at least one processing oil;
  - (4) about 1 to about 20 parts per hundred (phr) of at least one tackifier; and
  - (5) about 0.1 to about 15 parts per hundred of rubber (phr) of a curing system for said elastomers.

16. A pneumatic tire of claim 15 wherein said component (i) (A) is at least one polyamide resin, said component (i) (B) is at least one bromine-containing random elastomeric copolymer of a $C_4$ to $C_7$ isomonoolefin and a para-alkylstyrene and said tie layer component (1) is (i) a bromine-containing random copolymer of a $C_4$ to $C_7$ isomonoolefin and a para-alkylstyrene.

17. A pneumatic tire of claim 15 wherein said at least one tackifier comprises at least one member selected from the group consisting of rosin, rosin derivatives, condensate of tert-butyl phenol and acetylene, and mixtures thereof.

* * * * *